E. IRWIN.
HEN'S NEST.
APPLICATION FILED MAY 10, 1913.

1,123,300.

Patented Jan. 5, 1915.

2 SHEETS—SHEET 1.

Witnesses

Inventor
E. Irwin.
By D. Swift & Co.
Attorneys

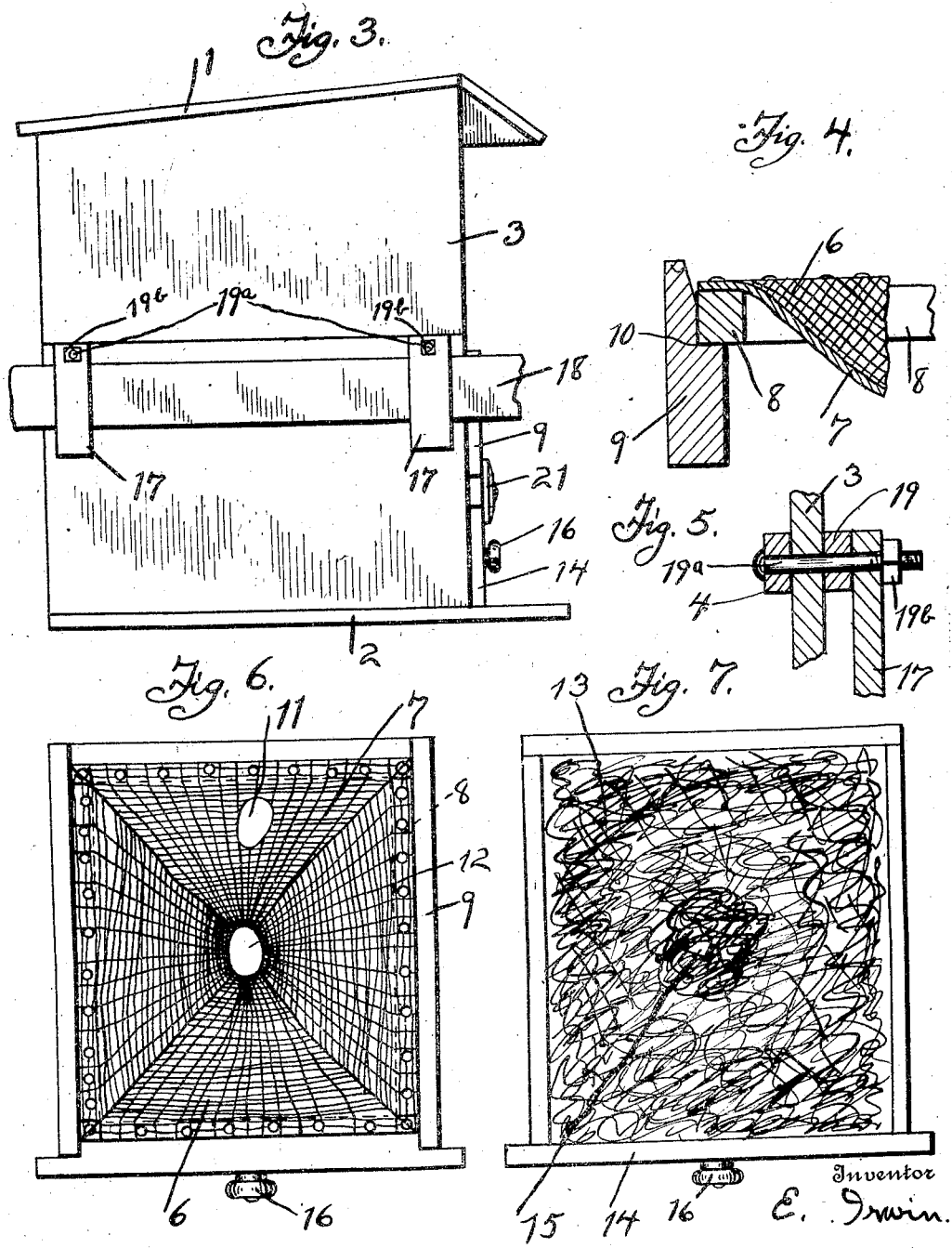

UNITED STATES PATENT OFFICE.

ELNORA IRWIN, OF MONTPELIER, INDIANA.

HEN'S NEST.

1,123,300. Specification of Letters Patent. Patented Jan. 5, 1915.

Application filed May 10, 1913. Serial No. 766,781.

*To all whom it may concern:*

Be it known that I, ELNORA IRWIN, a citizen of the United States, residing at Montpelier, in the county of Blackford and State of Indiana, have invented a new and useful Hen's Nest; and I do hereby declare the following to be a full, clear, and exact description of the invention, such as will enable others skilled in the art to which it appertains to make and use the same.

The invention relates to improvements in a combination hen's nest, and poultry coop.

One of the objects of the invention is the provision of means whereby the sanitation of the said nest may be promoted, so that when the eggs are laid they pass into a compartment beneath the nest where the same get beyond the reach of the hen so that they cannot be soiled by the hen.

Another object of the invention is the provision of a nest and coop of this character so constructed that the several compartments may be removed, so that the same may be conveniently fumigated when desired.

With these and other objects in view the invention consists in a novel construction and arrangement of parts hereinafter set forth, illustrated and claimed.

Figure 1:
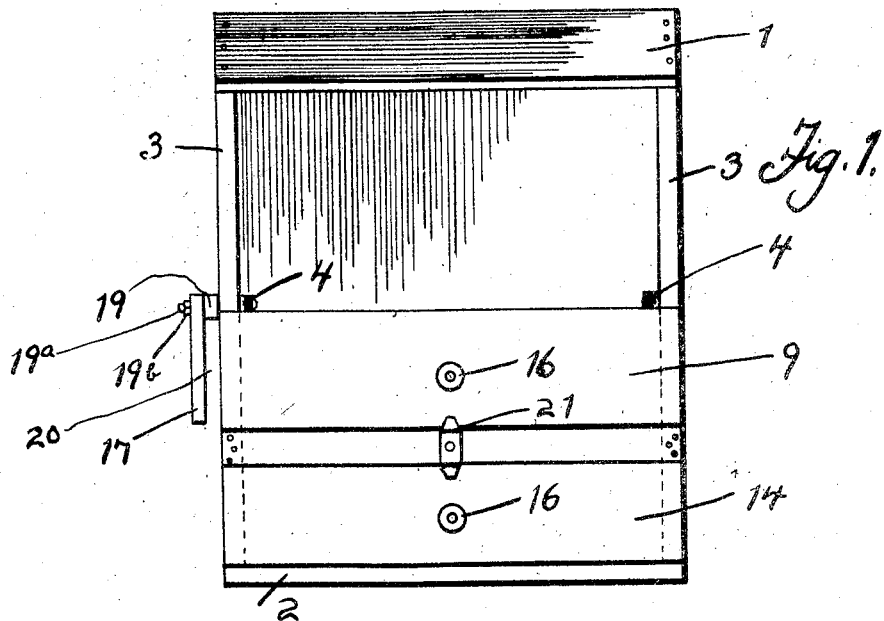
Figure 2:
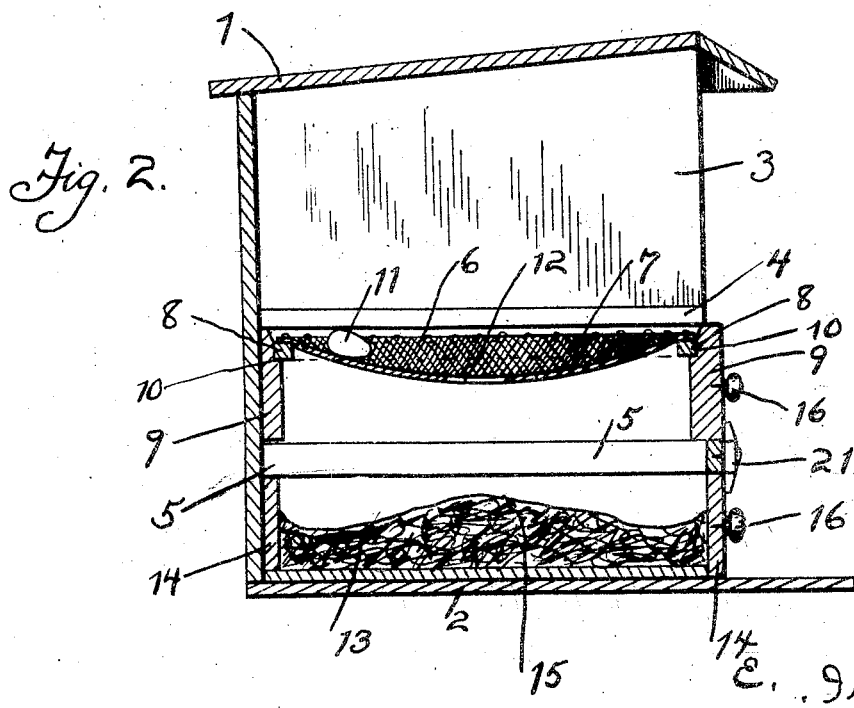

In the drawings:—Figure 1 is a front elevation of a nest constructed in accordance with the invention. Fig. 2 is a vertical sectional view. Fig. 3 is a side view. Fig. 4 is a detail sectional view on an enlarged scale showing a part of the seat and its support. Fig. 5 is a sectional view taken through the side and one of the arms. Fig. 6 is a plan view of the nest. Fig. 7 is a plan view of the egg depository or receptacle.

In the drawings which are for illustrative purposes only, and are accordingly not drawn to a scale, the numeral 1 designates the top of the coop and 2 the bottom, and 3 the sides. Each of the sides is provided with upper and lower transverse members 4 and 5. The transverse members 5 are designed for the support of the frames of the nest 6 which is slidable thereon. The nest 6 consists of fibrous or any suitable material 7 which is preferably knitted. The fibrous material 7 is secured to a rectangular nest frame 8 which is seated in another rectangular supporting frame or drawer 9, which is provided with front and rear shoulders 10, forming a seat in which the rectangular frame 8 is mounted. The rectangular frame 8 is readily removable from the frame or drawer 9 and can be conveniently fumigated when desired so as to maintain the sanitation of the nest thereby promoting the health of the hen and the cleanliness of the eggs. The seat 6 is provided with a false egg 11 which is secured thereto in any suitable manner and is designed to draw the attention of the hen to the nest. When an egg is laid it passes through an opening 12 and is caught by the pad 13 below, which is carried by a slidable receptacle 14. The pad 13 is preferably thickened or raised at the point 15 so as to shorten the fall as the egg passes through the opening 12. The rectangular member 8 and receptacle 14 are each provided with suitable knobs or handles 16 whereby they may be drawn out and removed from the casing or outward inclosure when desired. The coop is provided with downwardly projecting arms 17 which are adapted to engage a support 18 which may be mounted in the hen house (not shown). These arms 17 are spaced from the side walls 3 by a block or member 19, and the space 20 thereby provided is designed to receive the member 18.

These combined coops and nests can be mounted in any number desired on the transverse members 18 within the hen house or elsewhere. The arms 17 are secured to the side 3 of the coop by bolts 19ª provided with screw threaded nuts 19ᵇ.

It will be seen that my invention is simple, efficient and inexpensive, and is designed to promote the culture of poultry.

The invention having been set forth, what is claimed as new and useful is:—

1. In combination, upper and lower compartments, the upper compartment consisting of a slidably mounted member, a frame removably mounted in said upper compartment, and a flexible seat connected to said removably mounted frame, substantially as and for the purpose described.

2. A hen's nest including an inclosing casing, an egg receptacle therein, a pad arranged upon the egg receptacle, a supporting frame removably mounted within the casing over the receptacle and formed with a seat, a nest frame resting removably upon the seat of the supporting frame, and a flexible seat carried by the nest frame and formed with an egg discharge opening arranged over the pad of the egg receptacle.

In testimony whereof I have signed my name to this specification in the presence of two subscribing witnesses.

ELNORA IRWIN.

Witnesses:
 FRED O. ERNSHMILLER,
 CLAY BYERLY.